United States Patent
Marguet et al.

(10) Patent No.: US 6,809,639 B2
(45) Date of Patent: Oct. 26, 2004

(54) DETERMINATION OF WHEEL SENSOR POSITION USING RADIO FREQUENCY DETECTORS IN AN AUTOMOTIVE REMOTE TIRE MONITOR SYSTEM

(75) Inventors: Emmanuel Marguet, Arcon (FR); William David Stewart, Antrim (IE)

(73) Assignee: Schrader-Bridgeport International, Inc., Buffalo Grove, IL (US)

( * ) Notice: Subject to any disclaimer, the term of this patent is extended or adjusted under 35 U.S.C. 154(b) by 0 days.

(21) Appl. No.: 10/359,792

(22) Filed: Feb. 5, 2003

(65) Prior Publication Data

US 2003/0112138 A1 Jun. 19, 2003

Related U.S. Application Data

(62) Division of application No. 09/557,682, filed on Apr. 25, 2000, now Pat. No. 6,518,876.

(51) Int. Cl.⁷ .............................................. B60C 23/00
(52) U.S. Cl. ....................... 340/447; 73/146.5; 340/445
(58) Field of Search ................................ 340/442, 443, 340/444, 445, 446, 447; 73/146.5; 200/61.25

(56) References Cited

U.S. PATENT DOCUMENTS

| | | | |
|---|---|---|---|
| 5,109,213 A | * 4/1992 | Williams | 340/447 |
| 5,483,827 A | 1/1996 | Kulka et al. | 73/146.5 |
| 5,600,301 A | 2/1997 | Robinson, III | 340/442 |
| 5,602,524 A | 2/1997 | Mock et al. | 340/447 |
| 5,612,671 A | 3/1997 | Mendez et al. | 340/447 |
| 5,731,754 A | 3/1998 | Lee, Jr. et al. | 340/447 |
| 5,774,047 A | * 6/1998 | Hensel, IV | 340/442 |
| 5,808,190 A | * 9/1998 | Ernst | 73/146.5 |
| 5,880,363 A | 3/1999 | Meyer et al. | 73/146.5 |
| 5,883,305 A | * 3/1999 | Jo et al. | 73/146.5 |
| 5,924,055 A | * 7/1999 | Hattori | 340/447 |
| 6,031,450 A | 2/2000 | Huang | 340/442 |
| 6,043,738 A | 3/2000 | Stewart et al. | 340/447 |
| 6,112,587 A | * 9/2000 | Oldenettel | 340/445 |
| 6,215,389 B1 | 4/2001 | Schmidt | 340/447 |
| 6,340,930 B1 | 1/2002 | Lin | |
| 6,362,732 B1 | 3/2002 | Konchin et al. | 340/446 |
| 6,486,773 B1 | 11/2002 | Bailie et al. | |
| 6,489,888 B1 | 12/2002 | Honeck et al. | |
| 6,518,875 B2 | 2/2003 | DeZorzi | |
| 6,518,876 B1 | * 2/2003 | Marguet et al. | 340/447 |
| 6,580,365 B2 | * 6/2003 | Starkey | 340/447 |
| 6,609,419 B1 | 8/2003 | Bankart et al. | 73/146.5 |
| 2002/0003474 A1 | 1/2002 | McClelland et al. | |

FOREIGN PATENT DOCUMENTS

EP          0 760 299 B1      7/1996

OTHER PUBLICATIONS

VECTOR Application Note, Introduction to CAN, pp. 1–7.

* cited by examiner

*Primary Examiner*—Brent A. Swarthout
(74) *Attorney, Agent, or Firm*—Brinks Hofer Gilson & Lione (57) ABSTRACT

In a remote tire monitor system, radio frequency (RF) signals including tire data are transmitted from a plurality of tire monitors at wheels of a vehicle. At an RF receiver, the signals are received and tire data is detected. The RF signals are detected at a receiving RF detector associated with the transmitting tire monitor. The receiving RF detector produces a transmission indication in response to the received RF signals. A control unit is coupled to the RF receiver and the RF detector. The control unit receives the tire data and the transmission indication and associates a position of the transmitting tire monitor with the tire data in response to transmission indication. This permits automatic update of the position of tire monitors on the vehicle.

15 Claims, 3 Drawing Sheets

DETERMINATION OF WHEEL SENSOR POSITION USING RADIO FREQUENCY DETECTORS IN AN AUTOMOTIVE REMOTE TIRE MONITOR SYSTEM

This application is a division of application Ser. No. 09/557,682, filed Apr. 25, 2000, which is hereby incorporated by reference herein; now U.S. Pat. No. 6,518,876.

BACKGROUND OF THE INVENTION

The present invention relates generally to a remote tire monitoring system. More particularly, the present invention relates to a method and apparatus for automatically updating position information for tire monitors in such a system.

Systems have been developed to monitor a characteristic such as tire pressure of a vehicle and to report the characteristic to a receiver at a central monitoring station using radio transmissions. A monitor is located at each tire and periodically takes a measurement of the tire characteristic. The monitor then transmits the results of the measurement in a radio frequency transmission to the central monitoring station which produces an alarm or a display in response to the measurement.

One problem with such systems has been the need to program the location of the transmitters at the central station. To be fully useful, the tire characteristic data is preferably associated with the tire which originated the measurement when presenting a display or alarm. Each monitor includes identification information which can be transmitted with the measurement. The tire monitor is preferably activated to produce this information and the information is then conveyed to the central station and associated with the position of the tire.

In the technique of U.S. Pat. No. 5,600,301, the tire monitors each include a reed switch or other magnetic device. A magnet is passed near the reed switch, causing the monitor to transmit a radio frequency transmission that includes identification data. A service technician repeats this process at each wheel and then loads the identification and position information into the central monitoring station. Another method provides a printed bar code on each tire monitor which contains the identification information and which may be read with a suitable bar code reader.

In U.S. Pat. No. 5,880,363, an activation signal is provided from the central controller to a low frequency transmitter at each wheel well. The transmitter generates a low frequency signal to activate the tire monitor. The tire pressure monitor responds by generating a long wave identification signal and transmitting that signal with tire pressure and identification data directly to the control unit. The long wave identification signal is used to identify the position of the tire by distinguishing this transmission from other transmissions received by the controller.

U.S. Pat. No. 5,883,305 discloses two-way communication of data by radio signals. A tire pressure monitor is activated by a radio frequency signal transmitted by an antenna in the wheel well adjacent the tire. The tire pressure monitor transmits a second radio frequency signal which is detected by the wheel well antenna. The second signal is demodulated to detect that tire pressure data.

These previous techniques have been limited in effectiveness. The magnetic programming technique may be subject to interference and crosstalk, for example in a factory where many such tire monitors are being assembled with tires and vehicles. The bar code label system requires a label at each tire which can be lost or become dirty or illegible. The apparatus for transmitting a long wave activation signal and generating a long wave identification signal therefrom is too expensive for some applications. The two-way data communication techniques requires demodulation of the received radio signals at the wheel well and coaxial cabling back to the central controller, both of which add to the cost of the system.

A further limitation of some of these prior techniques is the manual operation requiring activation by a service technician. A system is desired which automatically conveys wheel position data to the receiver. Such a system would be particularly useful after any change in tire position, such as tire rotation or replacement of a tire.

SUMMARY

By way of introduction only, a remote tire monitor method and apparatus provide a central control unit in the cockpit or trunk of a vehicle. The control unit includes a radio frequency (RF) receiver and a controller. Tire monitors are located at each wheel of the vehicle and periodically transmit tire data such as tire pressure information, along with a tire monitor identifier. Four small, inexpensive RF detectors are located near each wheel, for example, in the wheel well. Each detector is connected to the central control unit by a power line and a ground line.

When a tire monitor transmits data by emitting an RF transmission, the RF detector that is closest to the transmitter will detect the burst of RF energy. The RF detector responds to the RF energy by modulating the power line to the control unit with the envelope of the transmitted data. The control unit detects this modulation on one of its power lines. Also, the RF receiver of the control unit receives and demodulates the data transmitted by the tire monitor. The control unit associates the received data with the position indication provided by the modulation on the power line. When the positions of the wheels on the vehicle are changed, the control unit can determine the new position using the modulated power line or by using the tire monitor identifier in the transmitted data.

The foregoing discussion of the preferred embodiments has been provided only by way of introduction. Nothing in this section should be taken as a limitation on the following claims, which define the scope of the invention.

DETAILED DESCRIPTION OF THE PRESENTLY PREFERRED EMBODIMENTS

Figure 1:
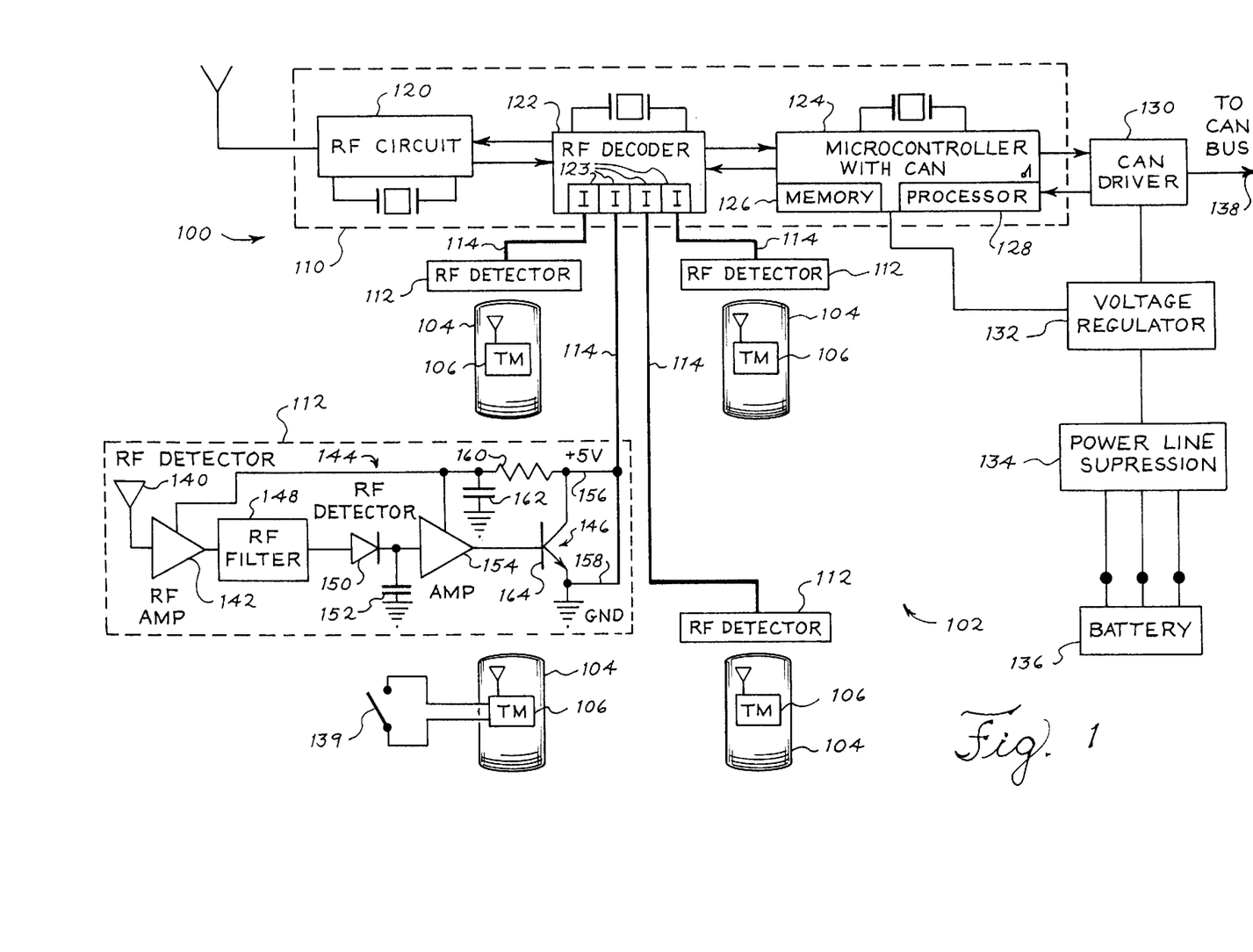
FIG. 1 is a block diagram of a remote tire monitor system shown in conjunction with portions of a vehicle.

Referring now to the drawing, it is a block diagram of a remote tire monitor system 100 shown in conjunction with portions of a vehicle 102. The vehicle 102 includes in this example four tires 104. Other numbers of tires may be included, such as a fifth tire as a spare or additional tires if the vehicle is a truck, trailer or other multi-wheeled vehicle.

Associated with each of the tires 104 is a transmitter or tire monitor 106. Each of the tire monitors 106 includes a battery powered, radio frequency (RF) transmitter. Any suitable tire monitor may be used. U.S. patent application Ser. No. 09/245,938 now U.S. Pat. No. 6,710,708, entitled "Method And Apparatus For A Remote Tire Pressure Monitor System," filed Feb. 5, 1999 in the name of McClelland et al., and commonly assigned with the present application is incorporated herein by reference and illustrates one suitable tire monitor for use in the remote tire pressure monitor system 100. Each tire monitor 106 includes a sensor such as a pressure sensor for measuring a tire characteristic. The tire monitor 106 converts the measured tire characteristic to tire data. The tire data is encoded for transmission from the tire monitor 106.

The tire monitor further includes a transmitter configured to transmit RF signals including the tire data. In some embodiments, the transmissions are encoded or randomized to minimize clashes at a receiver. For example, U.S. patent application Ser. No. 09/245,577 now U.S. Pat. No. 6,486,773, entitled "Method For Communicating Data In A Remote Tire Pressure Monitoring System," filed Feb. 5, 1999 in the name of Bailie, et al., and commonly assigned with the present application is incorporated herein by reference. This application shows a technique in which data words are transmitted separated by a time delay. The time delay for each respective data word is defined according to a repeating pattern common to the tires so that data words are transmitted during a plurality of aperiodic time windows. Transmission parameters such as modulation techniques, transmission frequency and transmission power are chosen according to local regulations and to assure reliable reception of the RF signals.

The tire monitor 106 includes a motion switch 139. The motion switch 139 closes upon detection of movement of the vehicle 100. The motion switch 139 provides a signal to the processor 124 indicating closure of the switch 139 and motion of the vehicle. In response to closure of the switch, the tire monitor system 100 begins operating, for example, by transmitting tire data. In the illustrated embodiment, during normal operation, the tire monitor 106 transmits supervisory tire pressure information once every minute. Any suitable motion switch may be used for the switch 139.

The remote tire monitor system 100 includes a control unit 110 and a plurality of radio frequency (RF) detectors 112. In alternative embodiment, the remote tire monitor system 100 additionally includes a user display for providing user information such as tire pressure information and low tire pressure alarms. In the illustrated embodiment, each RF detector 112 is mounted on the vehicle 102 proximate an associated tire monitor 106 to detect the RF signals from the associated tire monitor 106 and produce a transmission indication in response to detected RF signals. Each of the RF detectors 112 is electrically coupled by a conductor 114 to the control unit 110. Structure and operation of the RF detectors 112 will be described in greater detail below.

The control unit 110 includes an RF receiver 120, an RF decoder 122, and a controller 124. The RF receiver 120 is configured to receive RF signals conveying tire data from at least one transmitting tire monitor 106 of the plurality of tire monitors 106 associated with the wheels or tires 104 of the vehicle 102. Any suitable RF receiver circuit may be used. The design and implementation of the RF receiver 120 will depend on the type of modulation used for the RF signals, transmission frequency for the RF signals, and physical limitations such as permitted size, weight and power dissipation.

The RF decoder 122 is configured to receive a transmission indication from at least one receiving RF detector 112 of a plurality of RF detectors 112 associated with wheels or tires 104 of the vehicle 102. Thus, a tire monitor 106 will transmit RF signals which are detected by the RF detector 112 associated with the transmitting tire monitor 106. The receiving RF detector 112 signals its detection of the RF signals by providing the transmission indication on its associated conductor 114.

The RF decoder 122 is further configured to identify a position of a transmitting tire monitor on the vehicle in response to the transmission indication received from an RF detector. Accordingly, the RF decoder 122 includes a plurality of input circuits 123 coupled to the conductors 114 which are in turn coupled to the RF detectors 112. A transmission indication impressed on a conductor 114 is detected by an associated input circuit 123. In the illustrated embodiment, there is a one-to-one relationship between input circuits 123 and RF detectors 112. In this manner, the RF detector 112 which originated the transmission indication may be identified by the RF decoder determining which input circuit 123 detects the transmission indication. In alternative embodiments, the RF decoder 122 may include fewer than four input circuits 123 which are multiplexed in some manner among the plurality of RF detectors 112. For example, a single input circuit 123 may be time shared among the plurality of RF detectors 112 to reduce the cost and complexity of the RF decoder 122.

The RF decoder 122 is electrically coupled with the RF circuit 120. Upon receipt of RF signals at the RF circuit 120, the RF signals are demodulated to extract the tire data contained within the RF signals. In some applications, additional data decoding may be required after demodulation. The tire data in one exemplary embodiment includes a tire monitor identifier, or unique identification code which uniquely identifies the tire monitor 106 which transmitted the RF signals. In addition, in this exemplary embodiment, the tire data also includes tire pressure data related to a sensed tire pressure of the tire 104 at which the transmitting tire monitor 106 is located. Alternative tire data may be included or substituted for the tire pressure data, such as a number of tire revolutions, tire temperature, and so forth.

After extracting the tire data from the RF signals, the tire data is conveyed from the RF receiver 120 to the RF decoder 122. The RF decoder 122 associates the tire data with a position of the transmitting tire monitor 106 on the vehicle 102. Position information is determined using the input circuit 123 and a transmission indication received over a conductor 114 from RF detector 112. The tire data and associated tire position are conveyed from the RF decoder 122 to the controller 124.

The controller 124 controls the operation of the remote tire monitor system 100. The controller 124 is preferably a microcontroller including a processor 128 and a memory 126. The processor 128 operates in response to data and instructions stored in the memory 126 to control overall operation of the system 100.

In the illustrated embodiment, the processor 128 stores position data for a plurality of tire monitors 106 of the remote tire monitor system 100. The controller 124 is electrically coupled to the RF decoder 122 to receive tire data and position data from the RF decoder 122. In the illustrated embodiment, when tire data and position data are received at the microcontroller 124, the processor 128 retrieves stored position data from the memory 126. In one embodiment, the position data are stored in association with a position on the vehicle, such as left front, left rear, right front or right rear. The received position data is compared with the stored position data. If there is no change, the position data is not updated and further processing may occur using the received tire data. However, the processor 128 updates the position data for the transmitting tire monitor 106 when the position of the transmitting tire monitor 106 varies from the stored position data for the transmitting tire monitor. Thus, the controller 124 includes a memory 126 and a processor configured to store in the memory 126 position of the plurality of tire monitors 106 including the position of the transmitting tire monitor which originated the received position data.

In an alternative embodiment, the memory 126 is not used for storage of position data. Rather, the received tire data is associated by the control unit 110 with the position information provided by the transmission indication from a RF detector 112. The tire data and the position information from the input circuit 123 are used together to produce a display or alarm, if appropriate, by the system 100. Additionally, in still another embodiment, the tire data omits any identifying information for the transmitting tire monitor 106 and again, the tire data and the position information from the input circuit 123 are used together to produce the appropriate display or alarm.

Completing the identification of the elements in FIG. 1, the vehicle 102 further includes a CAN driver 130, a voltage regulator 132, power line noise suppressor 134, and a battery 136. The battery 136 provides operating power for electrical systems of the vehicle 102 including the remote tire monitor system 100. The battery 136 is a portion of the electrical power system of the vehicle, which typically also includes an alternator and other components. Such electrical power systems for vehicles are well known. The power line suppressor 134 reduces noise on the power line from the battery 136. Noise may originate in other electrical components of the vehicle 102, such as the ignition system. The voltage regulator 132 receives the battery voltage or other operating voltage from the power line suppressor 134 and produces a well regulated voltage for components such as the control unit 110 and CAN driver 130. The CAN driver 130 provides electrical interface with other elements of a Controlled Area Network. Controlled Area Network or CAN is a serial communication protocol for data commonly used in automotive and other applications. The CAN bus 138 accessed by the CAN driver 130 is used to interconnect a network of electronic nodes or modules. The CAN bus operates according to an adopted standard. In conjunction with a remote tire pressure monitor system 100, the CAN bus 138 may be used to convey tire monitor data to other locations in the vehicle 102. For example, an alarm or a display (not shown) may be controlled to provide a visual or audible indication to an operator of the vehicle 102 that the tire data indicates an out-of-range condition, such as low tire pressure.

In FIG. 1, the RF decoder 122 and the controller 124 are shown as separate elements of the control unit 110. In alternative embodiments, they may be combined in a single processor or logic block or circuit. Any other illustrated elements or additional elements included to enhance the functionality of the system 100 may be integrated or combined with other components of the system 100.

Further, the system 100 should not be restricted to use in conjunction with a CAN bus. In alternative embodiments, any other communications medium may be employed for interconnecting the system 100 with other elements of the vehicle 102. For example, communication buses in accordance with the J-1850 or USB standards may be substituted, or the control unit 110 may be directly hard wired with other elements of the vehicle 102. Still further, external communications may be omitted entirely so that the system 100 is completely self-contained.

FIG. 1 further shows a detailed view of one embodiment of an RF detector 112 for use in the remote tire monitor system 100. The RF detector 112 includes an antenna 140 to sense radio frequency (RF) signals transmitted from the tire monitor 106, an amplifier 142, an envelope detector coupled to the antenna 140 through the amplifier 142 and an output circuit 146 coupled to the envelope detector 144. The envelope detector 144 includes a filter 149, a diode 150, a capacitor 152 coupled to ground and an amplifier 154. The RF detector 112 is powered from a power line 156 and a ground line 158 provided on the conductor 114 which couples the RF detector 112 to the input circuit 123 of the RF decoder 122. To isolate the operational circuitry of the RF detector 112 from noise on the power line 156, the RF detector 112 further includes a resistor 160 and a capacitor 162 to ground.

The envelope detector 144 responds to the input signals received at the antenna and amplified by the amplifier 142 to produce at the output circuit 146 data corresponding to the envelope of the RF signals transmitted by the tire monitors 106. Thus, the filter 148, diode 150 and capacitor 152 together form a circuit coupled with the antenna 140 to detect an envelope of electrical signals produced by the antenna in response to the RF signals. The envelope is itself an electrical signal which is amplified in the amplifier 154. The output signal from the amplifier 154 is applied to the base of a transistor 164. In response to this signal at its base, the transistor 164 modulates a wireline signal on the conductor 114 in response to the envelope of the RF signals received at the RF detector 112. That is, the signals applied at the base of the transistor 164 control turn-on of the transistor 164, conducting current from its collector at the power node of the conductor 114 to its emitter at the ground node of the conductor 114. As a result, the current in the conductor 114 will be modulated in response to the RF signals received at the antenna 140 of the RF detector 112.

In one embodiment, to detect the modulated current, the input circuits 123 of the RF decoder in the illustrated embodiment may include a current mirror which duplicates the current drawn from the input stage of the input circuit 123, coupled to the conductor 114. The output current from the current mirror in the input circuit 123 is provided to a resistor which converts the current signal into a voltage signal which can be read by the microcontroller 124. Suitable current mirror circuits are within the purview of those ordinarily skilled in the art of circuit design.

In this manner, then, the signal provided on the conductor 114 forms a transmission indication indicating that the tire monitor 106 associated with the RF detector 112 has transmitted an RF signal which was detected by the RF detector 112. Producing the transmission indication includes detecting the envelope of the RF signals transmitted by the tire monitor 106 and producing a wireline signal on the conductor 114 in response to the envelope of the RF signals. In particular, in the illustrated embodiment, the wireline signal is produced by modulating a current in a conductor 114 coupled with the control unit 110. The control unit 110 detects the modulation of the current to locate the transmitting tire monitor 106.

Significantly, the RF detector 112 does not demodulate the data transmitted by the tire monitor 106. Only the RF circuit 120 of the control unit 110 demodulates the data to extract the contents of the RF signal 106. The RF detector only senses the presence of the transmitted RF signals. This reduces the cost of the RF detectors 112 and the overall cost of the remote tire monitor system 100.

Also, by modulating the current in the conductor 114, the RF detector's sensitivity to noise is reduced. Noise will occur in the form of voltage spikes or pulses on the conductor 114. However, this noise will have little effect on the operation of the RF detector 112 and will have little effect on the current levels in the conductor. As a result, the conductor 114 can be, for example, a twisted pair of wire or any other inexpensive two-wire cable. Coaxial cable or other shielded cable is not necessary for implementing the system 100 using RF detector 112.

In alternative embodiments, the RF circuit 120 may be omitted. In such an embodiment, the RF detectors 112 are used to detect the variations in the radio frequency signals and modulate a wire line signal on the conductors 114. The RF decoder 122 in such an embodiment is configured to demodulate the data in conjunction with the microcontroller 124. Current pulses on the conductor 114 are detected by the RF decoder 122 and converted to voltage pulses. The voltage pulses can be read by the microcontroller 124. In this manner, microcontroller 124 obtains the data from the RF detectors and the RF decoder, without use of an RF circuit 120. This has the advantage of eliminating the relatively expensive RF circuit. Further, this permits reduction in the transmit power used by the tire monitors 106 to transmit the radio frequency signals conveying the entire data. In some jurisdictions, substantially attenuated transmit power is required for applications such as tire monitors. These low transmit power requirements may be satisfied while still providing reliable performance in the remote tire monitoring system 100 by use of the RF detectors 112.

In still other embodiments, the functionality described herein may be implemented using a programmed computer or other processor operating in response to data and instructions stored in memory. The processor may operate in conjunction with some or all of the hardware elements described in the embodiments shown herein.

The disclosed tire monitor system may be used to provide an improved auto learn or auto train method for automatically identifying positions of a plurality of tire monitors on a vehicle. As noted above, previously devices such as a transponder or magnetic activation tools were used in the car plant to train the control unit of the remote tire monitor system with identifiers for the wheel sensors or tire monitors. With the vehicle located in a training booth or activation area at the factory, the wheel sensors were activated in sequence and the control unit, expecting activated pressure transmissions in a certain order, learned the identification and position on the vehicle of the wheel sensors. So as to prevent cross talk from other training booths, each activation area is required to be RF shielded. Another method of training the receivers was to use bar code readers to scan the identifiers of the wheel sensors and input this data into the receiver. All of these methods required an additional operation either manually or by automatic readers. These operations add cost and potential for downtime.

In the illustrated embodiment of FIG. 1, no such tools are required. In the car plant at the end of the production line, a standard one to two minute dynamic test is used to test and calibrate steering, brakes etc. of the vehicle. For the illustrated embodiment, positions and identities of the four tire pressure monitor wheel sensors are automatically learned during this dynamic test.

This is achieved by placing the control unit or receiver in a "learn state" at a dynamic test booth. The wheel sensors transmit either once a minute as in the normal mode, or in a special initial mode corresponding to a brand new, right out of the box state, transmitting more often, for example every 30 seconds, or every 10 seconds.

For example, when the wheel sensors leave the manufacturer's production line, they are placed in off mode. This mode means that each wheel sensor is dormant until it is activated by the closing of its motion switch. Closing the motion switch is only achievable through centrifugal force caused by spinning the tire monitor on a rotating wheel. During normal operation, the wheel sensor, while driving, transmits tire information including supervisory tire pressure once every minute. However, in the illustrated embodiment, for the driving periods during the first 16 activations of the motion switch, the wheel sensor will transmit the supervisory pressure data once every 30 seconds (to conform to United States regulatory requirements) or 10 seconds outside the United States. Other time intervals may be used. After the initial 16 transmissions, or any other suitable number, the transmission interval is changed to its normal mode value, such as one minute. This initial mode is known as factory test mode.

At the time of the dynamic vehicle test, the vehicle is accelerated, causing the wheel sensors to activate with the rotation of the wheels and associated closure of their motion switches. When the wheel sensors begin transmitting tire pressure, say once every thirty seconds, each sensor's identifier is transmitted by the sensor and is received up by the RF circuit of the control unit. In this initial unlearned state, the receiver loads the new identifier into memory, associating the transmission with one of the four RF detectors. Only data received which also is synchronized to activity on one of the RF detector conductors is regarded as valid. Over the one to two minute duration of the dynamic test, each wheel sensor will transmit numerous times and the control unit can verify the tire information, such as each wheel sensor identifier, and associated wheel position. The control unit can then load this data into non-volatile memory for subsequent normal use.

Key advantages of this auto-learn technique is the lack of any additional labor or equipment at the vehicle assembly plant, and the lack of a need for a transponder component or magnetic switch in the wheel sensor. Also there is no possibility of learning the wrong wheels, from other vehicles due to cross talk or of getting the wrong position. Thus, cost is reduced, operation is simplified and reliability is increased. Using the illustrated embodiment of the tire monitor system, no additional activation or learning tools are required to train the control unit with the wheel sensors' position on the vehicle. The only device required to train the control unit is the standard dynamic vehicle test at the end of line test in the vehicle assembly plant. Because the training procedure can be carried out in parallel with the steering and braking tests on the rolling road, and because of the factory test mode feature, no extra time or cost is required to 'auto learn' the tire monitor system.

The illustrated embodiment further provides for automatic update of tire monitor position information in the control unit upon replacement of one of the tire monitors of the system. This would occur, for example, if one of the wheels or tires of the vehicle is replaced. Due to the nature of the current embodiment, where the RF detectors are continuously indicating the position of the wheel sensors, a wheel sensor may be replaced and detected by the control unit without the need for user intervention. In this case, where a new wheel sensor is put on a wheel, the control unit initially realizes it is receiving a wrong identifier for the tire monitor, but still getting RF detector pulses from a particular wheel position. In addition, the control unit detects that the previously stored identifier for that position is no longer being received. Over a period of time, say ten minutes driving, the receiver verifies it has stopped receiving a stored identifier and is now receiving a new ID for that position. After verification, the new identifier is stored for that position and operation continues as normal.

The big advantage of this is the lack of need for user intervention and elimination of the need for a service tool at each service location. Tire monitor position and identification is updated automatically.

Figure 2:
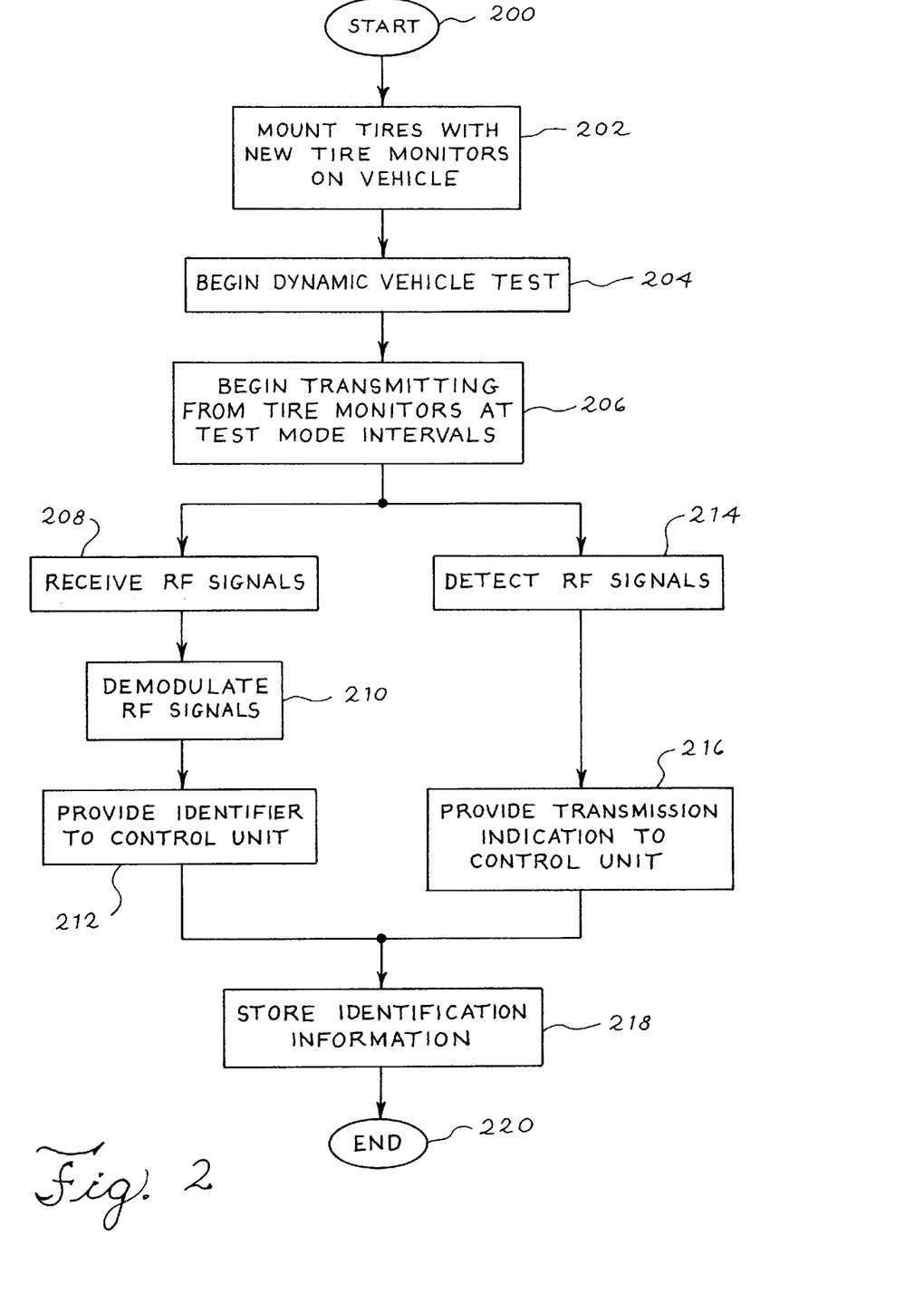
FIG. 2 is a flow diagram illustrating an auto learn method for the remote tire monitor system of FIG. 1.

FIG. 2 is a flow diagram illustrating an auto learn method for the remote tire monitor system of FIG. 1. The method begins at block 200. At block 202, one or more tires with new tire monitors are mounted on a vehicle which includes a remote tire monitor system. In this embodiment, the tire monitors are in unused, out of the box condition from the manufacturer. The installation of block 202 may occur as part of the final assembly of the vehicle at the factory. Alternatively, the installation may occur when new tires are installed on the vehicle or when a remote tire monitor system is added to the vehicle.

At block 204, the dynamic vehicle test is initiated and, in response, at block 206, the tire monitors begin transmitting radio frequency (RF) signals. The dynamic vehicle test is a test to check proper functionality of the systems of the vehicle, including drive train and brakes. Alternatively, any activity which causes the tire monitors to begin transmitting may be substituted at block 204 to initiate transmission at block 206. For example, the process of driving the vehicle from the end of the assembly line to a storage area or a final checkout area in block 204 may be adequate to begin transmission at block 206. It is contemplated that the tire monitors each include a motion switch which activates the tire monitor in response to motion of the tire monitor on the wheel of the vehicle.

Further, at block 206, the tire monitor begins transmitting at a test mode interval, such as once every 30 or 60 seconds. This aspect may be omitted but adds convenience for initializing the tire monitor system. After initialization, the interval may be reduced to reduce power drain from the battery which powers the tire monitor.

After transmission of the RF signals at block 206, the RF signals are received by a receiver of the remote tire monitor system at block 208. The RF signals are demodulated, decoded and otherwise processed to extract the data conveyed on the RF signals. For example, the tire monitor may modulate a carrier signal using data corresponding to pressure of the tire or a tire monitor identifier. The receiver of the remote tire monitor system demodulates the received RF signals to receive the data. At block 212, the data including a tire monitor identifier, if any, is provided to a control unit of the remote tire monitor system.

Meanwhile, the same RF signals received and demodulated at blocks 208, 210 are detected at block 214. In the preferred embodiment, the RF signals are received without demodulation, for example, using a detector of the type illustrated above in conjunction with FIG. 1. Other suitable RF detectors may be used. At block 216, in response to the detected RF signals, a transmission indication is provided to the control unit. The transmission indication indicates to the control unit which RF detector of the vehicle detected the RF signals transmitted by the tire monitor and received by the receiver at block 208.

At block 218, identification information associated with the tire monitor is stored. In one embodiment, the data forming the identifier transmitted by the tire monitor and received by the receiver of the remote tire monitor system is stored in memory. Other types and formats of identification information may be stored. For example, the control unit may store an RF detector indicator which indicates which RF detector detected the received RF signals.

In this manner, the described method provides automatic learn capability in a remote tire monitor system. No manual intervention is necessary for the control unit to identify and store the identities and locations of individual tire monitors on the vehicle. This reduces time and cost associated with initiating operation of the remote tire monitor system.

Figure 3:
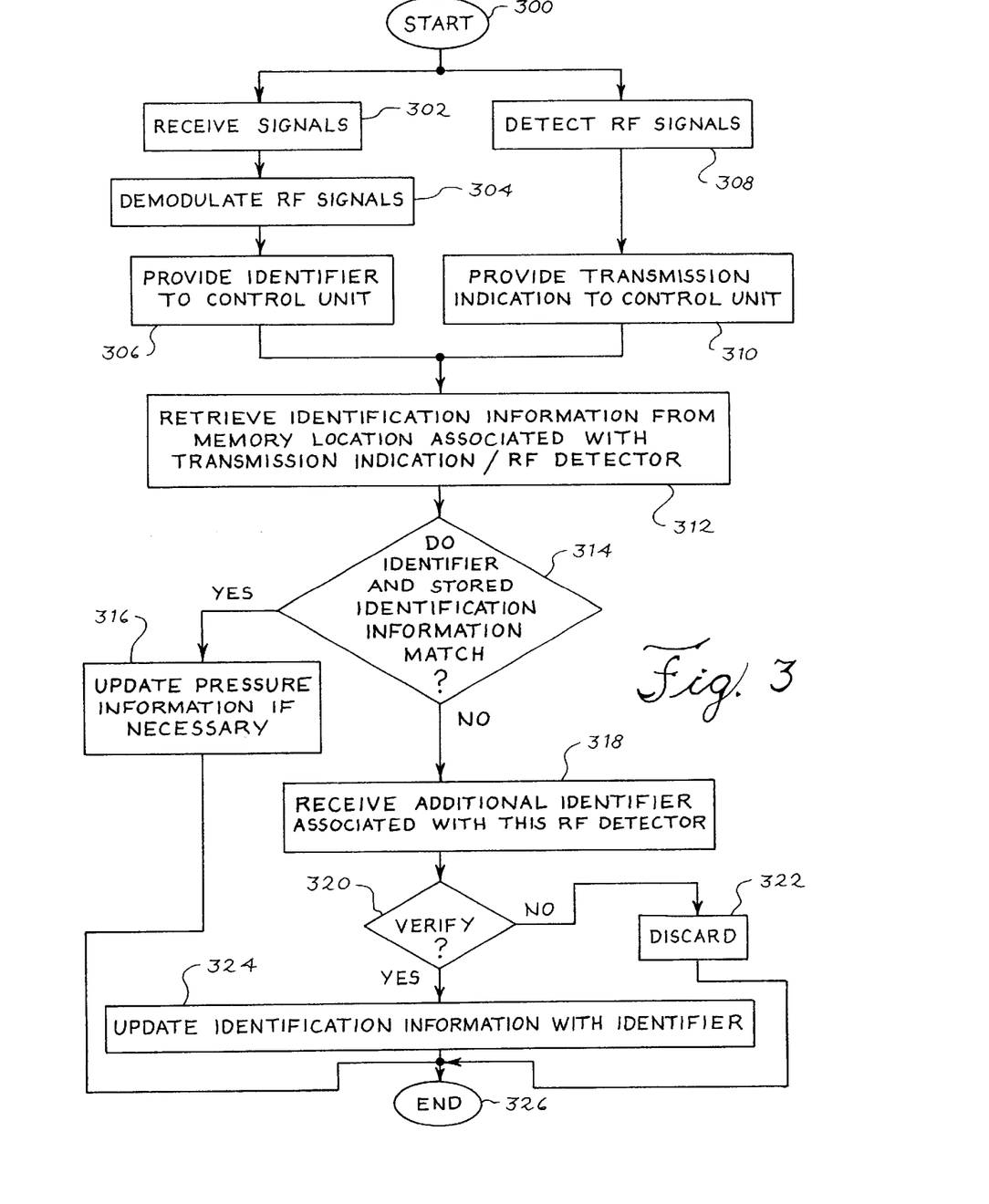
FIG. 3 is a flow diagram illustrating an auto learn method for the remote tire monitor system of FIG. 1.

FIG. 3 is a flow diagram illustrating an auto learn method for the remote tire monitor system of FIG. 1. The method of FIG. 3 starts at block 300.

At block 302, RF signals transmitted by a tire monitor associated with a wheel of a vehicle are received by a receiver of the remote tire monitor system. At block 304, the RF signals are demodulated, decoded and otherwise processed to extract the data conveyed on the RF signals. For example, the tire monitor may modulate a carrier signal using data corresponding to pressure of the tire or a tire monitor identifier. The tire monitor identifier may be a serial number or other unique or nearly-unique data associated with the tire monitor. For example, the tire monitor identifier may be multiple bit data stored in the tire monitor at the time of manufacture of the tire monitor. The receiver of the remote tire monitor system demodulates the received RF signals to receive the data. At block 306, the data including a tire monitor identifier, if any, is provided to a control unit of the remote tire monitor system.

Meanwhile, the same RF signals received and demodulated at blocks 302, 304 are detected at block 308. In the preferred embodiment, the RF signals are received without demodulation, for example, using a detector of the type illustrated above in conjunction with FIG. 1. Other suitable RF detectors may be used. At block 310, in response to the detected RF signals, a transmission indication is provided to the control unit. The transmission indication indicates to the control unit which RF detector of the vehicle detected the RF signals transmitted by the tire monitor and received by the receiver at block 302.

At block 312, stored identification information is retrieved from memory at the control unit. In the illustrated embodiment, the identification information is stored at a memory location associated with the transmission indication or RF detector. Thus, the control unit receives a wireline indication from a receiving RF detector that a transmission has been received. Using the wireline indication, the control unit selects the memory location from which previous identification information is retrieved.

At block 314, the control unit determines if the identifier received from the transmitting tire monitor matches the stored identification information. In this application, a match may mean a bit-by-bit match of received and stored data or some other level or association between the received data and the stored data. If the data match, at block 316, the tire information such as pressure data are updated. For example, in one embodiment, tire pressure data are stored along with the identification information for the tire monitor. If the received tire pressure data varies by a predetermined amount from the stored tire pressure data, the received tire pressure data is stored and an alarm or other user indication is generated.

At block 318, if there is no match between the received identifier and the stored identification information, the method waits for receipt of an additional transmission associated with this RF detector. Preferably, the tire monitor transmits pressure data and a tire monitor-identifier periodically, such as once per minute. Upon receipt of a subsequent transmission, at block 320, the method attempts to verify the previously received tire monitor identifier. This is done by comparing the newly received tire monitor identifier and the previously received tire monitor identifier to determine if there was an error in communication of the previously received tire monitor identifier. In some embodiments, multiple subsequent transmissions may be received for comparison. If there is no verification, at block 322, the mismatched transmission received at block 302 is discarded. This condition indicates that the same tire monitor continues to transmit, and the mismatched transmission was received with an error.

If at block 320 the newly received data verify the previously received data, the identification information stored for this RF detector is updated with the tire monitor identifier from the received transmission. This condition indicates that the tire monitor has been changed and is communicating reliably. In this manner, the illustrated system and method provide automatic update capability after a tire monitor has been changed. This may occur if the tires of the vehicle are rotated or if one or more tires is replaced. There is thus no need to manually intervene for the remote tire monitor system to update the identities and locations of the tire monitors on the vehicle.

From the foregoing, it can be seen that the present embodiments provide a method and apparatus which automatically conveys wheel position and data to a receiver in a vehicle. Even after changes in tire position due to tire rotation or replacement of a tire, the system automatically re-learns the position of the tires on the vehicle. No external actuation is required. Interference and cross talk are minimized by locating the RF detectors in close proximity to the tire monitors. The required components are relatively inexpensive and may be implemented at a relatively low cost. Further, the system provides automatic learn capability for learning and updating the identities of tire monitors on the vehicle without manual intervention.

While a particular embodiment of the present invention has been shown and described, modifications may be made. It is therefore intended in the appended claims to cover all such changes and modifications which fall within the true spirit and scope of the invention.

What is claimed is:

1. A radio frequency (RF) detector for use in association with a tire monitor of a remote tire monitor system of a vehicle, the RF detector comprising:
   an antenna to detect RE signals from the tire monitor;
   an envelope detector coupled to the antenna; and
   an output circuit coupled to the envelope detector to produce a transmission indication by modulating a signal on a conductor to a control unit of the remote tire monitor system in response to the detected RF signals.

2. The RF detector of claim 1 wherein the envelope detector comprises:
   a circuit coupled with the antenna to detect an envelope of electrical signals produced by the antenna in response to the RF signals; and
   an amplifier.

3. The RF detector of claim 1 wherein the RF detector is configured to produce the transmission indication without demodulating the RF signals.

4. The RF detector of claim 1 wherein the RF detector is mounted on the vehicle proximate the associated tire monitor to detect RF tire monitor signals from the associated tire monitor and produce the transmission indication in response to detected RF tire monitor signals.

5. A radio frequency (RF) detector for use in association with a tire monitor of a remote tire monitor system of a vehicle, the RF detector comprising:
   an antenna to detect RF signals from the tire monitor;
   an envelope detector coupled to the antenna; and
   an output circuit coupled to the envelope detector to produce a transmission indication by modulating a signal in response to the detected RF signals, the output circuit including at least one transistor to produce a wire line signal as the transmission indication.

6. A radio frequency (RF) detector for use in association with a tire monitor of a remote tire monitor system of a vehicle, the RF detector comprising:
   an antenna to detect RF signals from the tire monitor;
   an envelope detector coupled to the antenna, the envelope detector including a circuit coupled with the antenna to detect an envelope of electrical signals produced by the antenna in response to the RF signals and an amplifier; and
   an output circuit coupled to the envelope detector to produce a transmission indication by modulating a signal in response to the detected RF signals, the output circuit including at least one transistor which modulates a wire line signal in response to the envelope.

7. A radio frequency (RF) detector for use in association with a tire monitor of a remote tire monitor system of a vehicle, the remote tire monitor system including a plurality of tire monitors associated with tires of the vehicle and a control unit, the RF detector comprising:
   an amplifier to amplify RF signals transmitted by the tire monitor when the tire monitor is positioned at a tire proximate the RF detector, the RF signals including tire data for the tire;
   an envelope detector coupled to the amplifier to detect an envelope of the RF signals; and
   an output circuit to modulate a wireline signal on a conductor to the control unit in response to the envelope of the RF signals.

8. The RF detector of claim 7 wherein the RF detector is operationally coupled with a power line and a ground line provided on the conductor.

9. The RF detector of claim 8 wherein the envelope detector comprises:
   a filter coupled to the amplifier;
   a diode; and
   a capacitor coupled to the ground line.

10. The RF detector of claim 9 wherein the envelope detector further comprises an envelope amplifier coupled to the output circuit of the RF detector to amplify an envelope signal.

11. The RF detector of claim 10 wherein the output circuit comprises a transistor having a first terminal coupled to the envelope amplifier and a second terminal coupled to the conductor, the transistor modulating a current signal in the conductor in response to the amplified envelope signal.

12. A method for a remote tire monitor system including tire monitors associated with tires of a vehicle and a control unit, the method comprising:
   detecting an envelope of radio frequency (RE) signals transmitted by a tire monitor; and
   using the envelope of the BY signals to modulate a wireline signal on a conductor to the control unit so that the control unit can locate the transmitting tire monitor on the vehicle.

13. The method of claim 12 wherein detecting the envelope of the RF signals comprises sensing the RF signals without demodulating the RF signals.

14. The method of claim 12 wherein modulating the wireline signal on the conductor comprises modulating a current in the conductor.

15. The method of claim 14 wherein modulating the wireline signal on the conductor comprises:

applying an envelope signal to a first terminal of a transistor; and modulating a current between a second terminal and a third terminal of the transistor, the second terminal coupled to a power node of the conductor and the third terminal coupled to a ground node of the conductor.

* * * * *